(12) United States Patent
Ferre et al.

(10) Patent No.: US 8,902,792 B2
(45) Date of Patent: Dec. 2, 2014

(54) FORMING A CONVEX POLYGON OF MOBILE SENSORS

(71) Applicant: International Business Machines Corporation, Armonk, NY (US)

(72) Inventors: Wilfredo Ferre, Le Mesnil le Roi (FR); Dimitri Kanevsky, Ossining, NY (US); Tara N. Sainath, New York, NY (US); Marc P. Yvon, Antony (FR)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 13/681,771

(22) Filed: Nov. 20, 2012

(65) Prior Publication Data

US 2014/0114625 A1  Apr. 24, 2014

Related U.S. Application Data

(63) Continuation of application No. 13/659,108, filed on Oct. 24, 2012.

(51) Int. Cl.

| | | |
|---|---|---|
| H04L 12/28 | (2006.01) | |
| G01R 31/08 | (2006.01) | |
| G06F 11/00 | (2006.01) | |
| G08C 15/00 | (2006.01) | |
| H04J 3/14 | (2006.01) | |
| H04J 1/16 | (2006.01) | |
| H04L 1/00 | (2006.01) | |
| H04L 12/26 | (2006.01) | |
| H04W 24/00 | (2009.01) | |
| G01C 9/00 | (2006.01) | |
| G01C 17/00 | (2006.01) | |
| G01C 19/00 | (2013.01) | |
| G06F 17/10 | (2006.01) | |
| G06F 17/11 | (2006.01) | |

(52) U.S. Cl.
CPC .............. *G06F 17/10* (2013.01); *G06F 17/11* (2013.01)

USPC ........ 370/255; 370/254; 370/252; 455/456.1; 702/150

(58) Field of Classification Search
CPC ....... H04W 4/02; H04W 4/025; H04W 4/027; H04W 4/046; H04W 24/02; H04W 64/003; H04W 84/18; H04W 88/02; H04L 67/10; H04L 67/32; A61B 2019/5251; A61B 2019/0223; G06Q 30/0205
USPC ......... 370/328, 252, 389, 311, 338, 316, 254; 455/456.1, 67.13, 446, 457; 702/150, 702/118; 709/206, 224, 223
See application file for complete search history.

(56) References Cited

U.S. PATENT DOCUMENTS 7,177,295 B1 * 2/2007 Sholander et al. ............ 370/338
7,457,860 B2 * 11/2008 Shang et al. .................. 709/223
(Continued)

OTHER PUBLICATIONS

Doherty et al., Convex Position Estimation in Wireless Sensor Networks, IEEE INFOCOM 2001, Apr. 26, 2011.*

(Continued)

Primary Examiner — Benjamin H Elliott, IV
Assistant Examiner — Eric Nowlin
(74) Attorney, Agent, or Firm — Yee & Associates, P.C.; Anne Dougherty (57) ABSTRACT

Forming a convex polygon of a plurality of mobile sensors in an area is provided. Sensor output data received from the plurality of mobile sensors in the area is analyzed using an optimization problem. It is determined whether the plurality of mobile sensors forms the convex polygon in the area. In response to determining that the plurality of mobile sensors does form the convex polygon in the area, an objective function and a set of constraints corresponding to the optimization problem are generated. Then, a sparse solution of the optimization problem is calculated using the objective function and the set of constraints to determine vector weight values for each of the plurality of mobile sensors.

20 Claims, 7 Drawing Sheets

(56) References Cited

U.S. PATENT DOCUMENTS

| | | | | |
|---|---|---|---|---|
| 7,812,718 | B1* | 10/2010 | Chan et al. | 340/539.13 |
| 7,925,730 | B1* | 4/2011 | Gotsman et al. | 709/223 |
| 8,073,201 | B2 | 12/2011 | Satoh et al. | |
| 8,280,671 | B2* | 10/2012 | Luo et al. | 702/118 |
| 2003/0053424 | A1* | 3/2003 | Krishnamurthy et al. | 370/316 |
| 2005/0195761 | A1* | 9/2005 | Alicherry et al. | 370/328 |
| 2005/0288888 | A1* | 12/2005 | Ye et al. | 702/150 |
| 2007/0005292 | A1* | 1/2007 | Jin | 702/150 |
| 2007/0097895 | A1* | 5/2007 | Keshavarzian et al. | 370/311 |
| 2007/0195759 | A1* | 8/2007 | Chowdhury et al. | 370/389 |
| 2008/0097731 | A1 | 4/2008 | Lanes et al. | |
| 2008/0255777 | A1 | 10/2008 | Beard et al. | |
| 2009/0022369 | A1 | 1/2009 | Satoh et al. | |
| 2009/0303888 | A1* | 12/2009 | Ariyur et al. | 370/252 |
| 2009/0310496 | A1* | 12/2009 | Schuster et al. | 370/252 |
| 2010/0246485 | A1* | 9/2010 | Potkonjak | 370/328 |
| 2011/0181422 | A1 | 7/2011 | Tran | |
| 2011/0218759 | A1* | 9/2011 | Jin | 702/150 |
| 2011/0244885 | A1* | 10/2011 | Wigren | 455/456.1 |
| 2013/0017796 | A1* | 1/2013 | Milner et al. | 455/67.13 |
| 2013/0072223 | A1* | 3/2013 | Berenberg et al. | 455/456.1 |
| 2013/0128772 | A1* | 5/2013 | Potkonjak | 370/254 |
| 2014/0112201 | A1 | 4/2014 | Ferre et al. | |

OTHER PUBLICATIONS

Llorca et al., A Convex Optimization Method for Autonomous Self-Organization in Dynamic Wireless Networks, IEEE: MILCOM 2008, Nov. 19, 2008.*

Shih et al., CollECT: Collaborative Event deteCtion and Tracking in Wireless Heterogeneous Sensor Networks, IEEE, Proceedings of the 11th IEEE Symposium on Computers and Communications (ISCC'06), Jun. 29, 2006.*

Bulusu et al., GPS-less Low-Cost Outdoor Localization for Very Small Devices, IEEE, IEEE Personal Communications, vol. 7, Issue 5, Oct. 2000.*

Susca et al., "Monitoring Environment Boundaries with a Robotic Sensor Network," Technical Report CCDC-06-01-25, Mar. 23, 2006, pp. 1-26.

Djidjev, "Efficient Computation of Minimum Exposure Paths in a Sensor Network Field," Proceedings of the 3rd IEEE International Conference on Distributed Computing in Sensor Systems (DCOSS '07), Jun. 18-20, 2007, pp. 295-308.

Feng et al., "Localization Based on Feasible Geographic Region Approximation," Proceedings of the 66th IEEE Vehicular Technology Conference, Sep. 30, 2007-Oct. 3, 2007, pp. 264-268.

Shih et al., "CollECT: Collaborative Event deteCtion and Tracking in Wireless Heterogeneous Sensor Networks," Proceedings of the 11th IEEE Symposium on Computers and Communications (ISCC '06), Jun. 26-29, 2006, pp. 935-940.

Kempe, et al., "Gossip-Based Computation of Aggregate Information," Proceeding of the 44th Annual IEEE Symposium on Foundations of Computer Science (FOCS 2003), Oct. 11-14, 2003, 10 pages.

Boyd, et al., "Gossip Algorithms: design, analysis and applications," Proceedings of the 24th Annual Joint Conference of the IEEE Computer and Communications Societies (INFOCOM 2005), Mar. 13-17, 2005, 13 pages.

Ferre et al., "Forming a Convex Polygon of Mobile Sensors", U.S. Appl. No. 13/659,108, filed Oct. 24, 2012, 37 pages.

Office action regarding U.S. Appl. No. 13/659,108, dated Apr. 22, 2014, 65 pages.

* cited by examiner

FORMING A CONVEX POLYGON OF MOBILE SENSORS

This application is a Continuation of and claims the benefit of priority to U.S. patent application Ser. No. 13/659,108, filed on Oct. 24, 2012 and entitled "Forming a Convex Polygon of Mobile Sensors". The contents of which are hereby incorporated by reference.

BACKGROUND

1. Field

The disclosure relates generally to analyzing sensor data and more specifically to analyzing collected sensor data from a plurality of mobile sensors within a wireless network to determine a current status of an area by solving an optimization problem over a convex polygon formed by the plurality of mobile sensors in the area.

2. Description of the Related Art

A wireless sensor network is a collection of stationary sensor nodes, linked via some form of wireless communication network. The wireless sensor network may be built from a few sensor nodes to several hundreds or even thousands of sensor nodes. These sensor nodes are devices that may include a variety of sensor types to monitor the environment in which the sensor nodes are deployed. The different types of sensors may be, for example, sensors for detecting temperature, sound, vibration, pressure, motion, or pollutants. Wireless sensor networks include a number of unique characteristics, such as an ability to detect mobility of monitored events, heterogeneity of sensor nodes, large scale deployments, and unattended operation.

SUMMARY

According to one embodiment of the present invention, a computer system for forming a convex polygon of a plurality of mobile sensors in an area is provided. A computer analyzes sensor output data received from the plurality of mobile sensors in the area using an optimization problem. The computer determines whether the plurality of mobile sensors forms the convex polygon in the area. In response to the computer determining that the plurality of mobile sensors does form the convex polygon in the area, the computer generates an objective function and a set of constraints corresponding to the optimization problem. Then, the computer calculates a sparse solution of the optimization problem using the objective function and the set of constraints to determine vector weight values for each of the plurality of mobile sensors. According to another embodiment of the present invention, a computer program product for forming a convex polygon of a plurality of mobile sensors in an area is provided.

DETAILED DESCRIPTION

As will be appreciated by one skilled in the art, aspects of the present invention may be embodied as a computer system or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
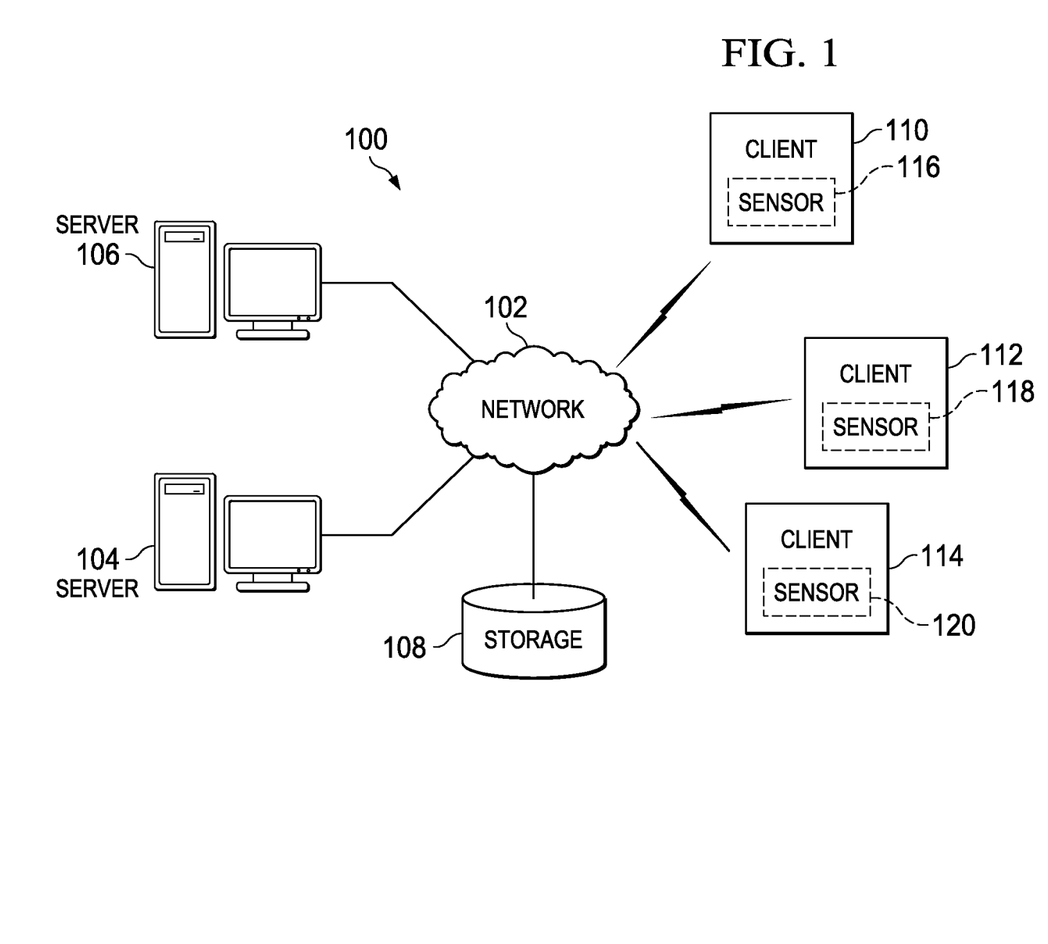
FIG. 1 is a pictorial representation of a network of data processing systems in which illustrative embodiments may be implemented.
Figure 2:
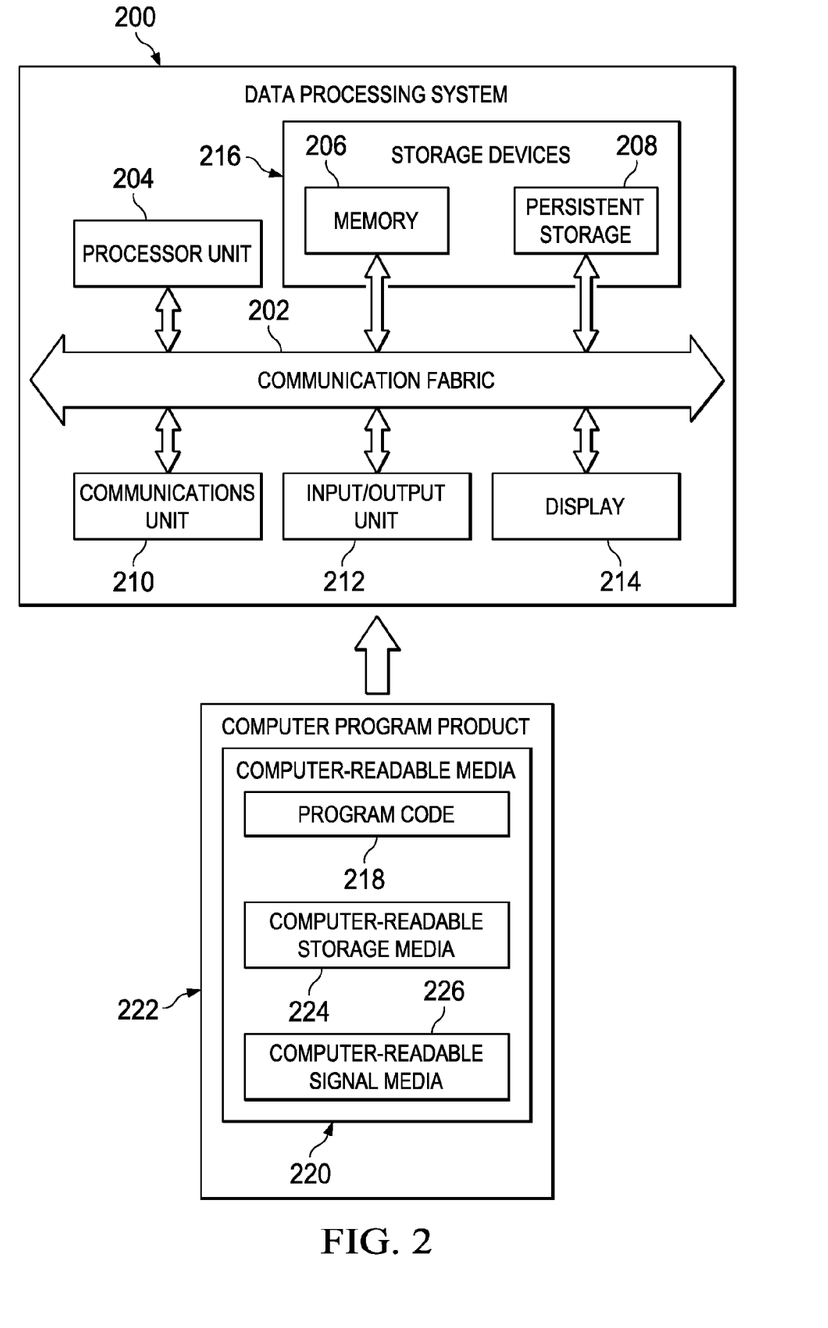
FIG. 2 is a diagram of a data processing system in which illustrative embodiments may be implemented.
Figure 3:
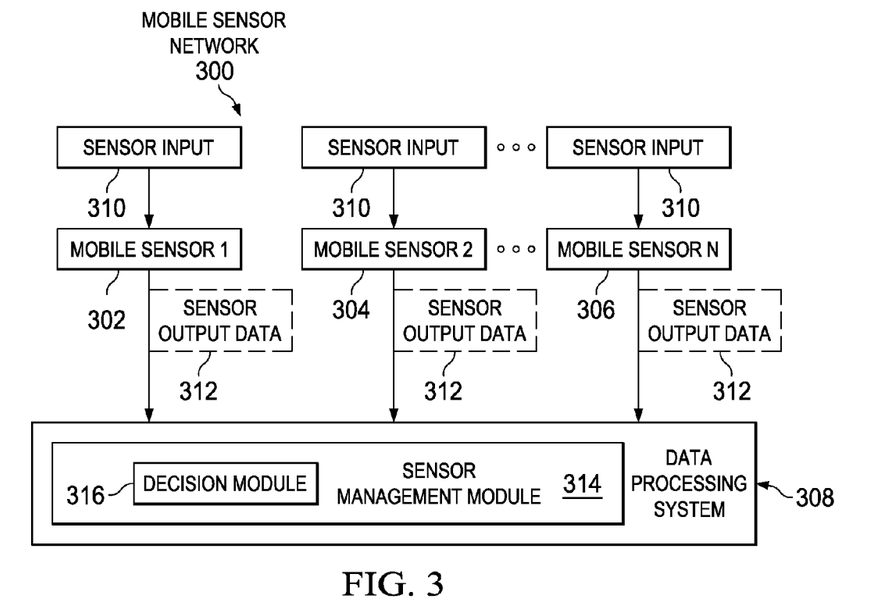
FIG. 3 is a diagram of a mobile sensor network in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Server 104 and server 106 may be, for example, server computers with high speed connections to network 102. Server 104 and/or server 106 may provide services for collecting, analyzing, and monitoring sensor data obtained by a plurality of mobile sensors connected to network 102.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. In this particular example, clients 110, 112, and 114 are mobile devices that include a sensor, such as sensors 116, 118, and 120. Clients 110, 112, and 114 may be, for example, cellular telephones, smart phones, personal digital assistants, gaming devices, handheld computers, or any combination of thereof, with wireless communication links to network 102. In addition, clients 110, 112, and 114 also may be any type of land, air, or water vehicle, such as a car, truck, train, plane, boat, or underwater craft, with wireless communication links to network 102. Further, a vehicle may be a manned vehicle or an unmanned vehicle, such as an autonomous or semi-autonomous robotic vehicle. Furthermore, each of clients 110, 112, and 114 is free to move independently of the other client devices and in any direction.

Each of sensors 116, 118, and 120 may represent a set of one or more sensors. Also, the set of sensors may be sensors of a same type or may be a combination of different types of sensors. Sensors 116, 118, and 120 detect and measure, for example, physical and/or environmental characteristics of an area, such as temperature, humidity, chemical odors, gases, smoke, sound, barometric pressure, objects in the area, distance to the objects in the area, speed of movement of the objects in the area, elevation of the area, geographic location of the area, et cetera. An object may be an animate object, such as a human, animal, or plant, or may be an inanimate object, such as fire, vehicle, or pollutant. Sensors 116, 118, and 120 also wirelessly transmit measured sensor data to server 104 and/or server 106 via network 102.

As an example, clients 110, 112, and 114 may be equipped with a set of sensors that are capable of detecting and measuring heat, humidity, and gases, which are produced by fire, such as carbon monoxide. When the sensors detect the event being monitored, such as heat, humidity, gases, et cetera, the sensors report the event to server 104 and/or server 106 via network 102. Server 104 and/or server 106 then analyze the sensor output data and take the appropriate action, such as, for example, send an alert message to a system administrator, based on the analysis of the sensor output data. Alternatively, server 104 and/or server 106 may send the sensor output data to another data processing system for an automated corrective action to be taken, such as starting an automated fire sprinkler system. Thus, illustrative embodiments by using the mobile sensors will know, for example, when the fire started, where the fire is located, how hot the fire is burning, how fast the fire is spreading, what objects are in the area of the fire, and what action or actions are to be taken in the event of a fire.

Storage unit 108 is a network storage device capable of storing data in a structured or unstructured format. Storage unit 108 may, for example, provide storage of current sensor output data, historical sensor output data, labels for sensor output data, prototype data that correspond to the sensor output data labels, optimization problems for determining convex polygons of a plurality of mobile sensors, objective functions for the optimization problems, constraints for the optimization problems, sparse solutions of the objective functions, sensor output data threshold values, and actions to be taken when sensor output data threshold values are exceeded. Current sensor output data are data that are currently being detected and measured by a plurality of mobile sensors in an area. Historical sensor output data are data that have been collected by a plurality of mobile sensors over a period of time in an area and may be used as a baseline to compare with current sensor output data for a particular area. Labels for sensor output data describe the type of data being measured by a plurality of mobile sensors. The labels are attached to or associated with the sensor output data for identification and/or classification of the sensor output data. Prototype data correspond to each of the sensor output data labels. Prototype data describe what the current status is or what is happening in a particular area based on the corresponding sensor output data label. An optimization problem finds the best solution from all candidate solutions, given a set of constraints defining which of the solutions is a candidate solution, and an objective function defining which of the candidate solutions is the best solution. The objective function is defined as a norm of a difference between a vector associated with prototype data that describes the current status of a particular area and a sum of mobile sensor vector weight values that represent the sensor output data associated with the particular area. A constraint is a condition that a sparse solution to an optimization problem is required to satisfy. A convex polygon is a geometric structure that is made of straight lines that connect with one another. In other words, the convex polygon is a closed shape with no curves. Also, the convex polygon has no internal angles that are greater than 180 degrees. Further, a corner point of the convex polygon formed by an intersection of lines is called a vertex. Furthermore, storage unit 108 may store other data, such as security information that may include user identification and passwords for system administrators. Moreover, it should be noted that network data processing system 100 may include any number of additional server devices, client devices, sensor devices, and other devices not shown.

Program code located in network data processing system 100 may be stored on a computer recordable storage medium and downloaded to a computer or other device for use. For example, program code may be stored on a computer recordable storage medium on server 106 and downloaded to client 114 over network 102 for use on client 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other data processing systems or devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 224 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments represent a plurality of wireless mobile sensors as a convex polygon and determine a set of active mobile sensors as a sparse solution of an optimization problem over the convex polygon. As a result, illustrative embodiments are able to quickly identify a set of active mobile sensors that are dynamically moving across a particular area of interest. In addition, illustrative embodiments may add and/or remove mobile sensors from the convex polygon as needed over a period of time. Consequently, the edges of the convex polygon may expand or contract and the number of vertices corresponding to the convex polygon may increase or decrease depending on the number of mobile sensors forming the convex polygon as time progresses.

Thus, illustrative embodiments provide a computer system and computer program product for forming a convex polygon of a plurality of mobile sensors in an area. A computer analyzes sensor output data received from the plurality of mobile sensors in the area using an optimization problem. The computer determines whether the plurality of mobile sensors forms the convex polygon in the area. In response to the computer determining that the plurality of mobile sensors does form the convex polygon in the area, the computer generates an objective function and a set of constraints corresponding to the optimization problem. Then, the computer calculates a sparse solution of the optimization problem using the objective function and the set of constraints to determine vector weight values for each of the plurality of mobile sensors.

With reference now to FIG. 3, a diagram of a mobile sensor network is depicted in accordance with an illustrative embodiment. Mobile sensor network 300 may be, for example, implemented in a network of data processing systems, such as network data processing system 100 in FIG. 1. Mobile sensor system 300 includes mobile sensor 1 302, mobile sensor 2 304, mobile sensor N 306, and data processing system 308. Mobile sensors 302-306 may be, for example, sensors 116-120 in FIG. 1. Mobile sensors 302-306 are free to move in any direction and independently of each other. In addition, mobile sensors 302-306 may represent any number of mobile sensors ranging from three to billions of mobile sensors connected to one or more wireless networks. Further, each of mobile sensors 302-306 may form a vertex of a convex polygon as shown in the example illustrations of FIG. 6 and FIG. 7.

Each of mobile sensors 302-306 may represent a set of one or more sensors. Also, mobile sensors 302-306 may be any type and combination of sensors. For example, mobile sensors 302-306 may detect and measure one or more of the physical and/or environmental characteristics of an area, such as temperature of the area, humidity of the area, chemical odors in the area, gases in the area, smoke in the area, sound in the area, barometric pressure of the area, objects in the area, distance to the objects in the area, speed of movement of the objects in the area, elevation of the area, and geographic location of the area. Of course it should be noted that mobile sensors 302-306 may be capable of detecting and measuring any type of sensor ascertainable characteristic of an area. As an example, mobile sensors 302-306 may be configured to detect and measure social characteristics of one or more people within an area, such as, for example, a room, building, vehicle, city block, or amusement park. A social characteristic may be, for example, an interaction between people, such as a voice level, speech content, tone of voice, level of emotion in speech, language spoken, physical contact between the people, type of physical contact, and the location of the physical contact.

Mobile sensors 302-306 detect and measure sensor input 310. Sensor input 310 may be, for example, audio input, video input, biometric input, or any combination thereof. Then, mobile sensors 302-306 wirelessly transmit sensor output data 312 to data processing system 308 via a network, such as network 102 in FIG. 1. Sensor output data 312 represents sensor input 310 after being detected, processed, and measured by mobile sensors 302-306. Data processing system 308 may be, for example, server 104 in FIG. 1. In addition, data processing system 308 may be implemented as data processing system 200 in FIG. 2. Further, it should be noted that data processing system 308 may wirelessly control the function and operation of mobile sensors 302-306.

Data processing system 308 receives sensor output data 312 from mobile sensors 302-306. Then, data processing system 308 analyzes sensor output data 312 using sensor management module 314. Sensor management module 314 represents sensor output data 312, which was detected by mobile sensors 302-306 in a particular area of interest, as a set of vector weight values that are defined by calculating a spare solution of an optimization problem over the convex polygon formed by mobile sensors 302-306. In addition, sensor management module 314 identifies which mobile sensors in the convex polygon are active sensors by determining those mobile sensors with a vector weight value that exceeds a predetermined vector weight threshold value. Further, sensor management module 314 determines which mobile sensors in the plurality of mobile sensors are to be included in the convex polygon and which of the mobile sensors should be removed. The mobile sensors that should be removed are those mobile sensors with a vector weight value below the predetermined vector weight threshold value or those mobile sensors that are no longer within a maximum defined range for the area of interest. In other words, sensor management module 314 makes sure that at least a set of mobile sensors in the plurality of mobile sensors in the area form a convex polygon.

It should be noted that even though a convex polygon is a 2-dimensional geometric structure, illustrative embodiments may be utilized in 3-dimensional space as well. In other words, illustrative embodiments may form a convex hull of a plurality of mobile sensors 3-dimensionally in an area instead of forming a convex polygon. A convex hull may be, for example, a convex polyhedron, which is a closed 3-dimensional geometric shape with flat faces and straight edges formed by a plurality of connected convex polygons. Thus, when a plurality of mobile sensors is measuring data 3-dimensionally in an area rather than 2-dimensionally, sensor management module 314 represents sensor output data 312 as a set of vector weight values that are defined by calculating a sparse solution of an optimization problem over the convex hull formed by the plurality of mobile sensors in the particular area of interest.

Afterward, sensor management module 314 sends sensor output data 312 received from mobile sensors 302-306 that form the convex polygon to decision module 316. Decision module 316 determines what the current status is of the particular area of interest based on an analysis of the sensor output data received from mobile sensors 302-306 that form the convex polygon. In addition, decision module 316 determines what action to take based on what the determined current status is of the particular area of interest. For example, decision module 316 may take no action if the current status of the area is determined to be within normal limits based on the sensor output data being between predetermined maximum and minimum sensor threshold values for the area. However, decision module 316 may perform one or more actions when the current status of the area is outside of normal limits based on the sensor output data being above or below the predetermined maximum and minimum sensor threshold values for the area. An action may be, for example, to alert emergency personnel, such as firemen, of the situation, such as fire, occurring in the particular area of interest.

Assume that each mobile sensor $T_i^t$, i=1, ... n in a plurality of mobile sensors within a wireless network is represented as a dynamic m-dimensional vector with values that represent some type of sensor measurement at some point in time t. These sensor measurements may be, for example, a carbon monoxide concentration level at a mobile sensor $T_i$ location within a particular area at a specific point in time t. The geometric structure that covers mobile sensors $T_1, \ldots T_n$ may be defined as a convex polygon of the mobile sensors (i.e., a sum of all vector weight values corresponding to mobile sensors $T_i$. By denoting vector weight values at point in time t as $\beta^t = (\beta_1^t, \beta_1^t, \ldots \beta_1^t) \in R^n$, illustrative embodiments define the convex polygon corresponding to vertexes $T_i^t$, i=1, ... n as $$P^t = \beta_1^t * T_1^t + \beta_2^t * T_2^t + \ldots + \beta_n^t * T_n^t \text{ such that } \sum_{i=1}^{n} \beta_i^t = 1 \text{ and } \beta_i^t \geq 0. \quad (1)$$

This convex polygon changes in size and shape with the passage of time as vectors $T_i^t$ change. Assume also that there is some objective function $F(\beta, T^t, y^t)$ that defines how sensor measured events $y^t$, which may be represented as a vector weight value that depends on time, may be defined as a point in a convex polygon $P^t$. Assume that a point $p^t = \Sigma \beta_i^t T_i^t$ in the convex polygon $P^t$ is calculated as a sparse solution of the optimization problem $$\beta^{*t} = \underset{\beta}{\arg\min} F(\beta, T^t, y^t) \text{ such that } \sum_{i=1}^{n} \beta_i^t = 1 \text{ and } \beta_i^t \geq 0. \quad (2)$$

This optimization problem provides a strategy for determining which mobile sensors in a plurality of mobile sensors in an area to keep for some predetermined interval of time. For example, illustrative embodiments will include those mobile sensors $T_i$ that have there vector weight values $\beta^*_i{}^t$ non-zero for a period of time that is above a time interval threshold value. In addition, illustrative embodiments will exclude other mobile sensors if their corresponding vector weight values $\beta^*_i{}^t$ are below a predetermined vector weight threshold value. Thus, illustrative embodiments are able to generate convex polygons that dynamically change over time by the inclusion and/or exclusion of mobile sensors in an area. One way to introduce sensor measured events y into the optimization problem is to have some description of the situation occurring in the area (e.g., prototype data) defined as a vector that should match the sensor measurements in some way. This may be performed if, for example, sensor measured events y represent control sensor measurements that were detected by a special control mobile sensor system, which arrived in an area because some event occurred that required attention, such as a fire, traffic accident, or the like. Alternatively, sensor measured events y may represent some mobile sensor measurement that provides qualitative information about the current status of an area of interest that is covered by a plurality of mobile sensors forming a convex polygon. For example, sensor measured event $y_1=1$ if a carbon monoxide concentration within an area formed by the convex polygon is defined as low (i.e., below a predetermined low carbon monoxide threshold value=no fire) or sensor measured event $y_1=10$ if the carbon monoxide concentration within the area formed by the convex polygon is defined as high (i.e., above a predetermined high carbon monoxide threshold value=fire). Similarly, sensor measured event $y_2=1$ if a traffic pattern within an area formed by a convex polygon is defined as low (i.e., below a predetermined low traffic pattern threshold value=no accident) or sensor measured event $y_2=10$ if the traffic pattern within the area formed by the convex polygon is defined as high (i.e., above a predetermined high traffic pattern threshold value=accident). In this way, every entry for sensor measured events y may be represented as a number on a scale, such as, for example, on a scale of 1 to 10.

An example of the objective function F may be $$F=|y-H\beta|^2-\lambda|\beta|^2 \quad (3)$$

where illustrative embodiments generate matrix H using vectors of mobile sensors $T_i$ as columns. This objective function F is concave for sufficiently large $\lambda$ (e.g., $\lambda 1\beta 1^2$ plays a role of a penalty). The solution of equation 3 is often sparse even if $\lambda$ is small and objective function F is not concave since a solution of unconstrained problem $$\hat{\beta}^t = \underset{\beta}{\operatorname{argmin}} F(\beta, T^t, y^t) \quad (4)$$

often lies outside an area covered by a convex polygon P and a projection of $\hat{\beta}^t$ on the convex polygon P is usually sparse because $\hat{\beta}^t$ projects on some convex polygon edges or boundaries, which means that some vector weight values $\beta_i$ become a zero value.

Figure 4:
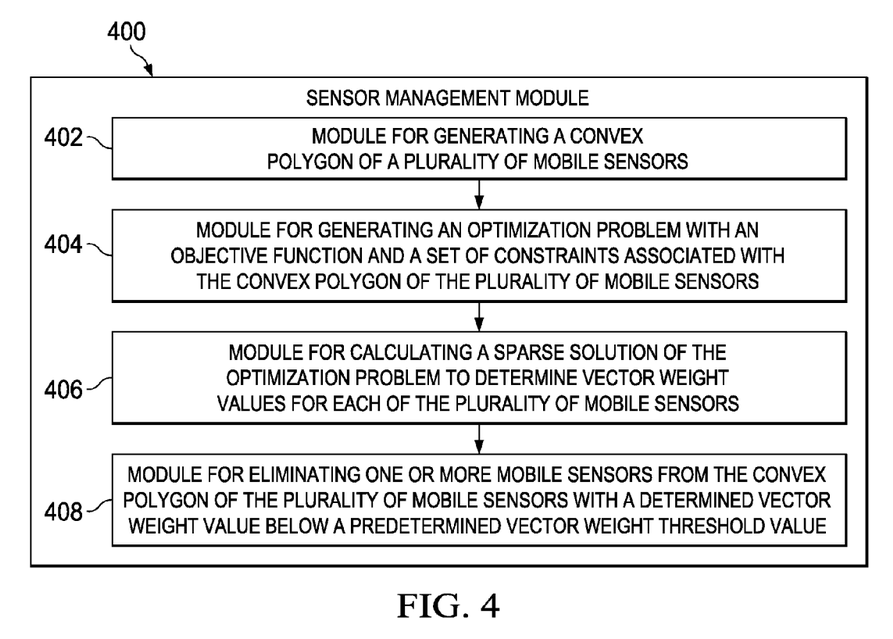
FIG. 4 is a diagram illustrating an example of a sensor management module in accordance with an illustrative embodiment.

With reference now to FIG. 4, a diagram illustrating an example of a sensor management module is depicted in accordance with an illustrative embodiment. Sensor management module 400 may be, for example, sensor management module 314 in FIG. 3. Sensor management module 400 includes modules 402-408. However, it should be noted that sensor management module 400 is only intended as an example and may include more or fewer modules depending on alternative illustrative embodiments.

Module 402 is a module for generating a convex polygon of a plurality of mobile sensors, such as mobile sensors 302-306 in FIG. 3. Module 402 may generate the convex polygon by utilizing a set of mobile sensors in the plurality of mobile sensors. The set of mobile sensors may include all of the plurality of mobile sensors in a particular area of interest, a portion of the plurality of mobile sensors, or only those mobile sensors in the plurality of mobile sensors that have a determined vector weight value above a predetermined vector weight threshold value.

Module 404 is a module for generating an optimization problem with an objective function and a set of constraints associated with the convex polygon of the plurality of mobile sensors. Module 406 is a module for calculating a sparse solution of the optimization problem to determined vector weight values for each of the plurality of mobile sensors. Module 408 is a module for eliminating one or more mobile sensors from the convex polygon of the plurality of mobile sensors with a determined vector weight value below a predetermined vector weight threshold value. In other words, a mobile sensor with a determined vector weight value below the predetermined vector weight threshold value is not contributing a significant level of sensor output data or no sensor data at all. Thus, module 408 will not include those mobile sensors with a determined vector weight value below the predetermined vector weight threshold value in the convex polygon. In addition, module 408 may eliminate or not consider vector weight values of mobile sensors that lie within the boundaries or edges of the convex polygon. Further, sensor management module 400 also may include a module for adding one or more mobile sensors to the convex polygon of the plurality of mobile sensors with a determined vector weight value above the predetermined vector weight threshold value.

Figure 5:
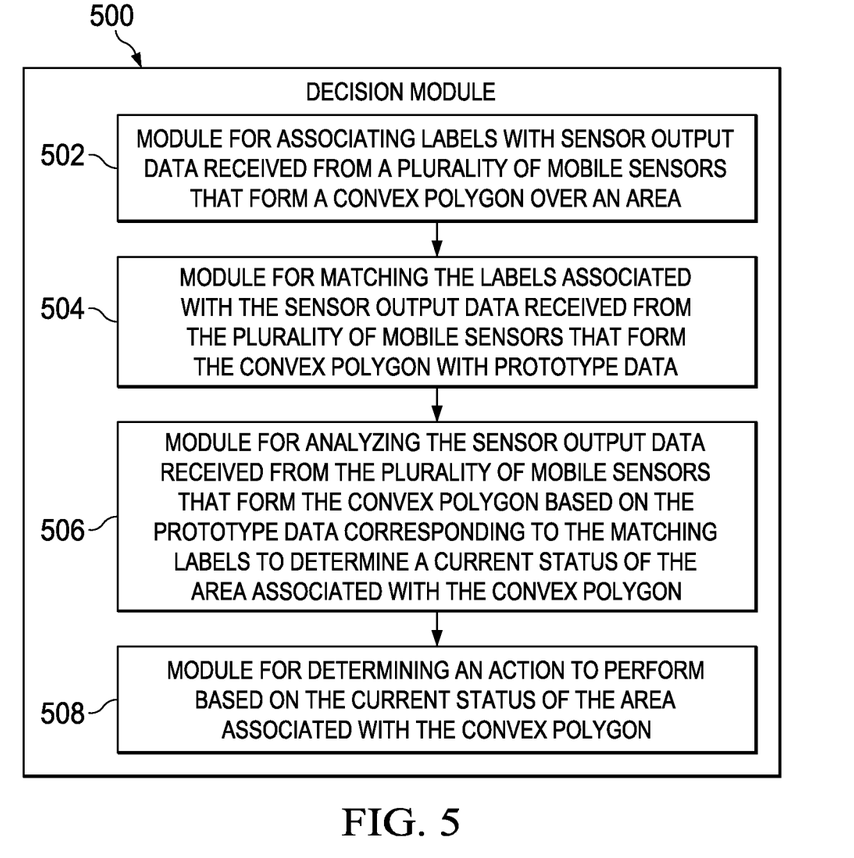
FIG. 5 is a diagram illustrating an example of a decision module in accordance with an illustrative embodiment.

With reference now to FIG. 5, a diagram illustrating an example of a decision module is depicted in accordance with an illustrative embodiment. Decision module 500 may be, for example, decision module 316 in FIG. 3. Decision module 500 includes modules 502-508. However, it should be noted that decision module 500 is only intended as an example and may include more or fewer modules depending on alternative illustrative embodiments.

Module 502 is a module for associating labels with sensor output data received from a plurality of mobile sensors that form a convex polygon over a particular area of interest. Module 504 is a module for matching the labels associated with the sensor output data received from the plurality of mobile sensors that form the convex polygon with prototype data. Prototype data describes the situation occurring in, or the current status of, the particular area of interest. Module 506 is a module for analyzing the sensor output data received from the plurality of mobile sensors that form the convex polygon based on the prototype data corresponding to the matching labels to determine a current status of the particular area of interest associated with the convex polygon. Module 508 is a module for determining an action to perform based on the current status of the particular area of interest associated with the convex polygon.

Figure 6:
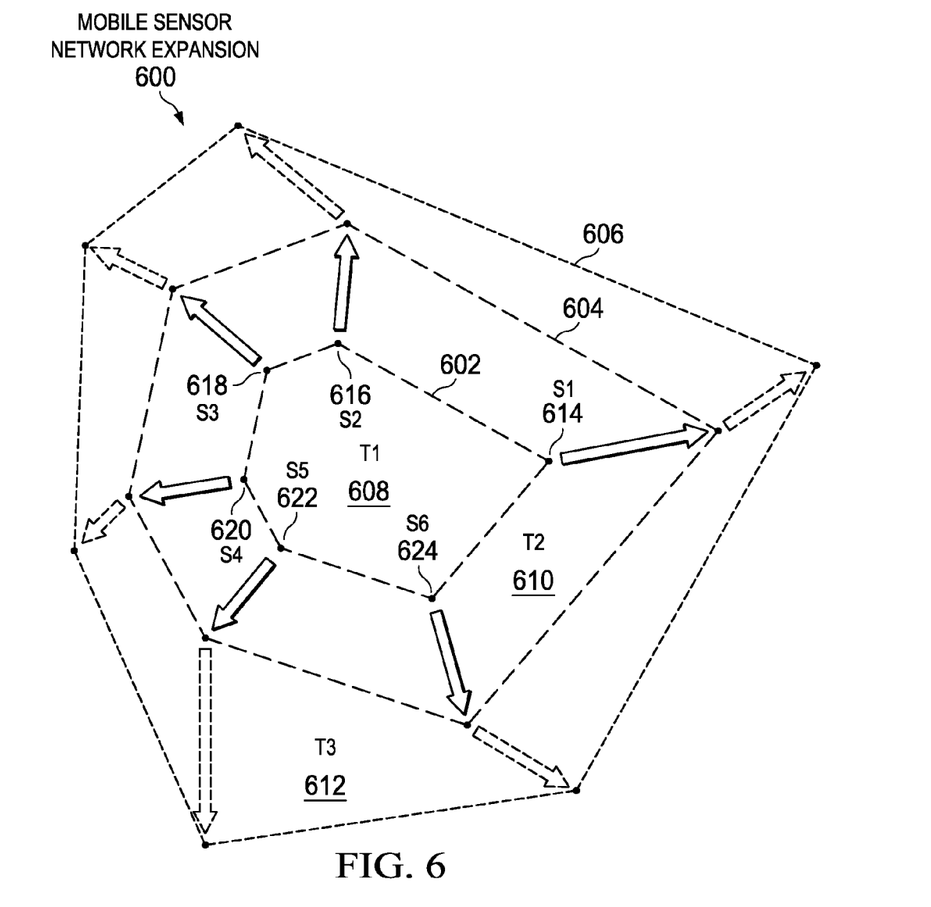
FIG. 6 is a diagram illustrating an example of mobile sensor network expansion in accordance with an illustrative embodiment.

With reference now to FIG. 6, a diagram illustrating an example of mobile sensor network expansion is depicted in accordance with an illustrative embodiment. Mobile sensor network expansion 600 illustrates how a wireless network consisting of a plurality of mobile sensors, which form a convex polygon, can expand over time. For example, convex polygon 602 at time T1 608 includes mobile sensor S1 614, mobile sensor S2 616, mobile sensor S3 618, mobile sensor S4 620, mobile sensor S5 622, and mobile sensor S6 624. In other words, six mobile sensors form convex polygon 602 at time T1 608.

Also, it should be noted that each of the six mobile sensors 614-624 forms a vertex of convex polygon 602. At time T2 610, mobile sensors 614-624 form the vertices of convex polygon 604, which expand the edges of convex polygon 602 as mobile sensors 614-624 move in an outward direction from the vertices of convex polygon 602 from time T1 608 to time T2 610. At time T3 612, mobile sensors 614-624 form the vertices of convex polygon 606. However, it should be noted that mobile sensors 614-624 are moving in a different direction between times T2 610 and T3 612. As a result, the shape of convex polygon 606 is different from the shape of convex polygons 602 and 604. As noted above, each of the mobile sensors may move in any direction, at any time.

Moreover, a state of a mobile sensor may change, for example, from an ON state to an OFF state, at any time. As a result, a sensor management module, such as sensor management module 314 in FIG. 3, will eliminate from the convex polygon a mobile sensor that changes state from an ON state to an OFF state. Thus, the size and the shape of the convex polygon may continually change over passage of time as the sensor management module eliminates mobile sensors from or adds mobile sensors to the convex polygon. However, in this example all six mobile sensors 614-624 remain in convex polygons 602-606 from time T1 608 through time T3 612.

Figure 7:
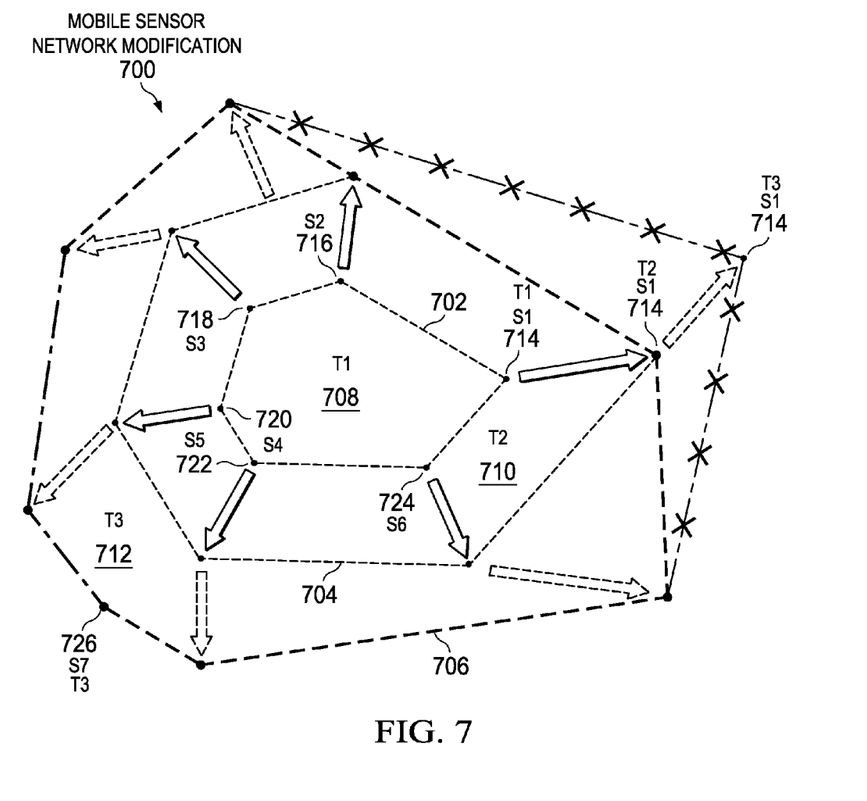
FIG. 7 is a diagram illustrating an example of mobile sensor network modification in accordance with an illustrative embodiment.

With reference now to FIG. 7, a diagram illustrating an example of mobile sensor network modification is depicted in accordance with an illustrative embodiment. Mobile sensor network modification 700 illustrates how a wireless network consisting of a plurality of mobile sensors, which form a convex polygon, changes over a period of time. For example, convex polygon 702 at time T1 708 includes mobile sensor S1 714, mobile sensor S2 716, mobile sensor S3 718, mobile sensor S4 720, mobile sensor S5 722, and mobile sensor S6 724. In other words, six mobile sensors form convex polygon 702 at time T1 708.

Also, it should be noted that each of the six mobile sensors 714-724 form a vertex of convex polygon 702. At time T2 710, mobile sensors 714-724 form the vertices of convex polygon 704, which is an expansion of the edges of convex polygon 702 as mobile sensors 714-724 move in an outward direction from the vertices of convex polygon 702 from time T1 708 to time T2 710. However at time T3 712, mobile sensors 714-724 are moving in a different direction between times T2 710 and T3 712. As a result, the shape of convex polygon 706 is different from the shape of convex polygons 702 and 704.

In addition, it should be noted that mobile sensor S1 714 at time T3 712 is no longer eligible to be included in convex polygon 706. For example, the weighted vector value of mobile sensor S1 714 at time T3 712 may now be below a predetermined weighted vector threshold value and not considered significant. For example, mobile sensor S1 714 may be configured to detect and measure levels of carbon monoxide. Assume at time T2 710, the level of carbon monoxide detected by mobile sensor S1 714 was above a predetermined carbon monoxide threshold value. High levels of carbon monoxide are significant in that higher concentrations of carbon monoxide may indicate fire or other dangerous condition in an area. Then assume at time T3 712 the level of carbon monoxide detected by mobile sensor S1 714 was below the predetermined carbon monoxide threshold value and thus determined insignificant. As a result, a sensor management module, such as sensor management module 314 in FIG. 3, will keep the vertex associated with mobile sensor S1 714 at time T2 710 in convex polygon 706 when the vector weight value of mobile sensor S1 714 was still considered significant and eliminate mobile sensor S1 714 at time T3 712 from convex polygon 706.

Further, it should be noted that convex polygon 706 includes seven vertices instead of the six vertices included in convex polygons 702 and 704. In this example, the sensor management module adds a new mobile sensor, mobile sensor S7 726, to convex polygon 706. Assume at time T3 712, the level of carbon monoxide detected by mobile sensor S7 726 was above the predetermined carbon monoxide threshold value. As a result, the sensor management module adds a vertex associated with mobile sensor S7 726 at time T3 712 to convex polygon 706 because the weighted vector value of mobile sensor S7 726 is considered significant. Thus, the sensor management module manages this elastic (i.e., expanding and contracting) network of mobile sensors. The sensor management module may recalculate the size and shape of the convex polygon based on the number and location of the mobile sensors comprising the convex polygon every ten seconds, for example. However, illustrative embodiments may recalculate the convex polygon of mobile sensors in a particular area at any time interval, such as every one second, five seconds, ten seconds, 15 seconds, 30 seconds, one minute, five minutes, ten minutes, 15 minutes, 30 minutes, one hour, one day, or any other increment of time.

Furthermore, the sensor management module may define a time limit for the use of previously recorded vector weight values associated with a mobile device that is no longer eligible for inclusion in the convex polygon for an area. The time limit defines when previously recorded vector weight values associated with a mobile device become stale and are no longer statistically significant. Moreover, the sensor management module may define a maximum zone for a particular area. For example, the sensor management module may define the maximum zone for a particular area in terms of feet, yards, miles, or any other increment of measurement. In addition, the sensor management module may define the maximum zone for an area in terms of a room in a building, an entire building, a city block, an entire city, a county, a state, a country, a hemisphere, or the entire globe depending on the scope of the service being provided and/or what the mobile sensors are monitoring.

Figure 8:
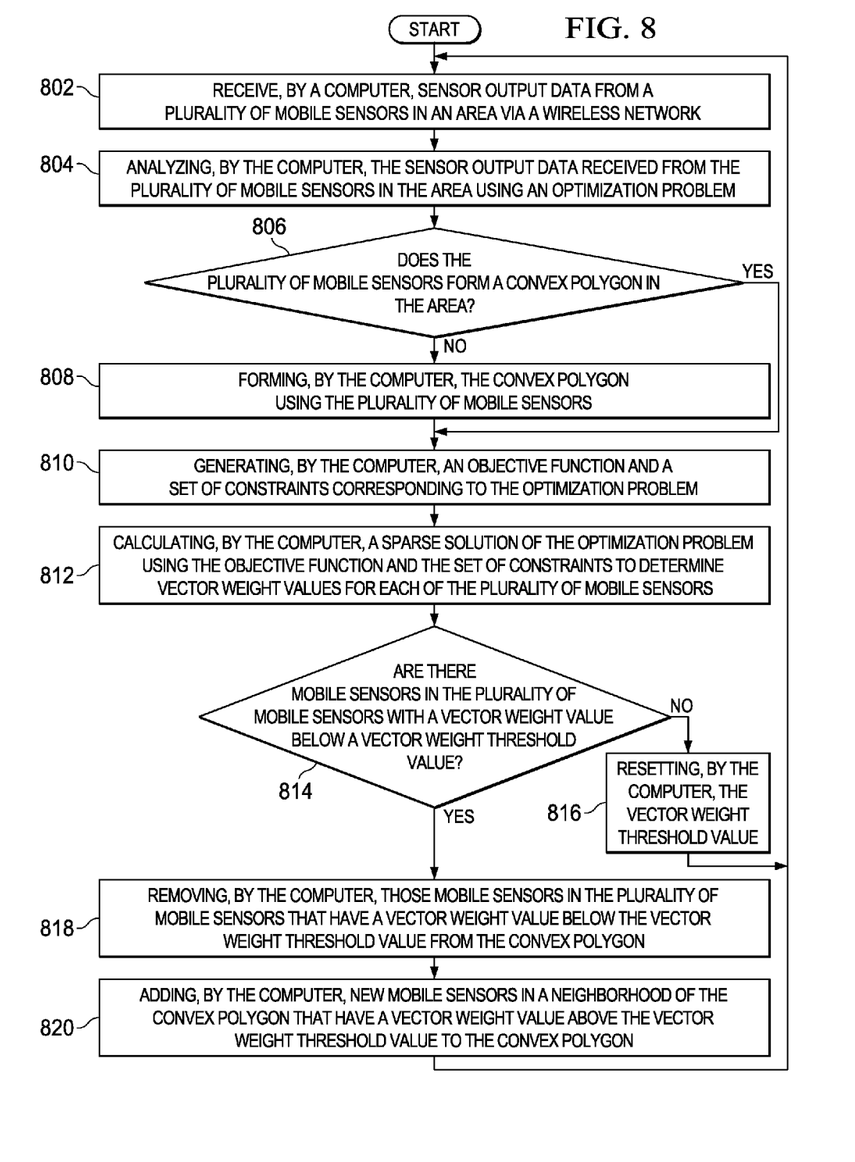
FIG. 8 is a flowchart illustrating a process for forming a convex polygon of mobile sensors in accordance with an illustrative embodiment.

With reference now to FIG. 8, a flowchart illustrating a process for forming a convex polygon of mobile sensors is shown in accordance with an illustrative embodiment. The process shown in FIG. 8 may be implemented in a computer, such as, for example, data processing system 200 in FIG. 2 or data processing system 308 in FIG. 3.

The process begins when the computer receives sensor output data from a plurality of mobile sensors in an area via a wireless network (step 802). The sensor output data from the plurality of mobile sensors may be, for example, sensor output data 312 from mobile sensors 302-306 in FIG. 3. Afterward, the computer analyzes the sensor output data received from the plurality of mobile sensors in the area using an optimization problem (step 804).

Then, the computer makes a determination as to whether the plurality of mobile sensors forms a convex polygon in the area (step 806). The convex polygon may be, for example, convex polygon 602 in FIG. 6. If the computer determines that the plurality of mobile sensors does not form a convex polygon in the area, no output of step 806, then the computer forms the convex polygon using the plurality of mobile sensors (step 808). Thereafter the process proceeds to step 810. If the computer determines that the plurality of mobile sensors does form a convex polygon in the area, yes output of step 806, then the computer generates an objective function and a set of constraints corresponding to the optimization problem (step 810).

In addition, the computer calculates a sparse solution of the optimization problem using the objective function and the set of constraints to determine vector weight values for each of the plurality of mobile sensors (step 812). Subsequently, the computer makes a determination as to whether there are mobile sensors in the plurality of mobile sensors with a vector weight value below a vector weight threshold value (step 814). If the computer determines that there are no mobile sensors in the plurality of mobile sensors with a vector weight value below a vector weight threshold value, no output of step 814, then the computer resets the vector weight threshold value (step 816). The computer may reset the vector weight threshold value by increasing the vector weight threshold value to increase the statistical significance of received sensor output data. However, it should be noted that illustrative embodiments may modify the process in other ways if the computer determines that there are no mobile sensors in the plurality of mobile sensors with a vector weight value below a vector weight threshold value. Thereafter, the process returns to step 802 where the computer continues to receive sensor output data from the plurality of mobile sensors in the area.

If the computer determines that there are mobile sensors in the plurality of mobile sensors with a vector weight value below a vector weight threshold value, yes output of step 814, then the computer removes those mobile sensors in the plurality of mobile sensors that have a vector weight value below the vector weight threshold value from the convex polygon (step 818). Further, the computer adds new mobile sensors in a neighborhood of the convex polygon that have a vector weight value above the vector weight threshold value to the convex polygon (step 820). Thereafter, the process returns to step 802 where the computer continues to receive sensor output data from the plurality of mobile sensors in the area.

Thus, illustrative embodiments provide a computer system and computer program product for forming a convex polygon of a plurality of mobile sensors in an area. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for forming a convex polygon of a plurality of mobile sensors in a defined area of interest, the computer system comprising:
a bus system;
a storage device connected to the bus system, wherein the storage device stores computer readable program code; and
a processor unit connected to the bus system, wherein the processor unit executes the computer readable program code to:
analyze qualitative sensor output data received from the plurality of mobile sensors in the defined area of interest using an optimization problem;
determine whether the plurality of mobile sensors forms the convex polygon within the defined area of interest;
generate an objective function and a set of constraints corresponding to the optimization problem in response to determining that the plurality of mobile sensors does form the convex polygon within the defined area of interest, wherein the objective function is a difference between a vector associated with prototype data that describes a current status of the defined area of interest and a sum of vector weight values associated with the plurality of mobile sensors that represent the qualitative sensor output data; and
calculate a sparse solution of the optimization problem using the objective function and the set of constraints to determine vector weight values for each of the plurality of mobile sensors.

2. The computer system of claim 1, wherein the processor unit further executes the computer readable program code to:
determine whether there are mobile sensors in the plurality of mobile sensors with a vector weight value below a vector weight threshold value; and
remove those mobile sensors in the plurality of mobile sensors that have a vector weight value below the vector weight threshold value from the convex polygon in response to determining that there are mobile sensors in the plurality of mobile sensors with a vector weight value below the vector weight threshold value.

3. The computer system of claim 2, wherein the processor unit further executes the computer readable program code to:
reset the vector weight threshold value in response to determining that there are no mobile sensors in the plurality of mobile sensors with a vector weight value below the vector weight threshold value.

4. The computer system of claim 2, wherein the processor unit further executes the computer readable program code to:
add new mobile sensors in a neighborhood of the convex polygon that have a vector weight value above the vector weight threshold value to the convex polygon.

5. The computer system of claim 1, wherein the processor unit further executes the computer readable program code to:
generate the convex polygon using a set of mobile sensors in the plurality of mobile sensors.

6. The computer system of claim 1, wherein the processor unit further executes the computer readable program code to:
attach labels that describe a type of qualitative data being measured by the plurality of mobile sensors to the qualitative sensor output data received from the plurality of mobile sensors that form the convex polygon within the defined area of interest.

7. The computer system of claim 6, wherein the processor unit further executes the computer readable program code to:
match the labels attached to the qualitative sensor output data received from the plurality of mobile sensors that form the convex polygon with prototype data that describe the current status of the defined area of interest.

8. The computer system of claim 7, wherein the processor unit further executes the computer readable program code to:
analyze the qualitative sensor output data received from the plurality of mobile sensors that form the convex polygon based on the prototype data corresponding to the matching labels to determine the current status of the defined area of interest associated with the convex polygon.

9. The computer system of claim 8, wherein the processor unit further executes the computer readable program code to:
determine a corrective action to perform in response to determining that the current status of the defined area of interest associated with the convex polygon is outside predetermined sensor threshold limits based on the qualitative sensor output data received from the plurality of mobile sensors.

10. A computer program product stored on a non-transitory computer readable storage medium having computer readable program code encoded thereon that is executable by a computer for forming a convex polygon of a plurality of mobile sensors in a defined area of interest, the computer program product comprising:
   computer readable program code for analyzing qualitative sensor output data received from the plurality of mobile sensors in the defined area of interest using an optimization problem;
   computer readable program code for determining whether the plurality of mobile sensors forms the convex polygon within the defined area of interest;
   computer readable program code for generating an objective function and a set of constraints corresponding to the optimization problem in response to determining that the plurality of mobile sensors does form the convex polygon within the defined area of interest, wherein the objective function is a difference between a vector associated with prototype data that describes a current status of the defined area of interest and a sum of vector weight values associated with the plurality of mobile sensors that represent the qualitative sensor output data; and
   computer readable program code for calculating a sparse solution of the optimization problem using the objective function and the set of constraints to determine vector weight values for each of the plurality of mobile sensors.

11. The computer program product of claim 10, further comprising:
   computer readable program code for determining whether there are mobile sensors in the plurality of mobile sensors with a vector weight value below a vector weight threshold value; and
   computer readable program code for removing those mobile sensors in the plurality of mobile sensors that have a vector weight value below the vector weight threshold value from the convex polygon in response to determining that there are mobile sensors in the plurality of mobile sensors with a vector weight value below the vector weight threshold value.

12. The computer program product of claim 11 further comprising:
   computer readable program code for resetting the vector weight threshold value in response to determining that there are no mobile sensors in the plurality of mobile sensors with a vector weight value below the vector weight threshold value.

13. The computer program product of claim 11 further comprising:
   computer readable program code for adding new mobile sensors in a neighborhood of the convex polygon that have a vector weight value above the vector weight threshold value to the convex polygon.

14. The computer program product of claim 10 further comprising:
   computer readable program code for generating the convex polygon using a set of mobile sensors in the plurality of mobile sensors.

15. The computer program product of claim 10 further comprising:
   computer readable program code for attaching labels that describe a type of qualitative data being measured by the plurality of mobile sensors to the qualitative sensor output data received from the plurality of mobile sensors that form the convex polygon within the defined area of interest.

16. The computer program product of claim 15 further comprising:
   computer readable program code for matching the labels attached to the qualitative sensor output data received from the plurality of mobile sensors that form the convex polygon with prototype data, that describe the current status of the defined area of interest.

17. The computer program product of claim 16, further comprising:
   computer readable program code for analyzing the qualitative sensor output data received from the plurality of mobile sensors that form the convex polygon based on the prototype data corresponding to the matching labels to determine the current status of the defined area of interest associated with the convex polygon.

18. The computer program product of claim 17, further comprising:
   computer readable program code for determining a corrective action to perform in response to determining that the current status of the defined area of interest associated with the convex polygon is outside predetermined sensor threshold limits based on the qualitative sensor output data received from the plurality of mobile sensors.

19. A method for forming a convex polygon of a plurality of mobile sensors in a defined area of interest, the method comprising:
   analyzing, by a computer, qualitative sensor output data received from the plurality of mobile sensors in the defined area of interest using an optimization problem;
   determining, by the computer, whether the plurality of mobile sensors forms the convex polygon within the defined area of interest;
   responsive to the computer determining that the plurality of mobile sensors does form the convex polygon within the defined area of interest, generating, by the computer, an objective function and a set of constraints corresponding to the optimization problem, wherein the objective function is a difference between a vector associated with prototype data that describes a current status of the defined area of interest and a sum of vector weight values associated with the plurality of mobile sensors that represent the qualitative sensor output data; and
   calculating, by the computer, a sparse solution of the optimization problem using the objective function and the set of constraints to determine vector weight values for each of the plurality of mobile sensors.

20. The method of claim 19 further comprising:
   determining, by the computer, whether there are mobile sensors in the plurality of mobile sensors with a vector weight value below a vector weight threshold value; and
   responsive to the computer determining that there are mobile sensors in the plurality of mobile sensors with a vector weight value below the vector weight threshold value, removing, by the computer, those mobile sensors in the plurality of mobile sensors that have a vector weight value below the vector weight threshold value from the convex polygon.

* * * * *